(12) United States Patent
Lee

(10) Patent No.: US 10,089,741 B2
(45) Date of Patent: Oct. 2, 2018

(54) EDGE DETECTION WITH SHUTTER ADAPTION

(71) Applicant: PixArt Imaging (Penang) SDN. BHD., Penang (MY)

(72) Inventor: Siew Chin Lee, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 100 days.

(21) Appl. No.: 15/250,943

(22) Filed: Aug. 30, 2016

(65) Prior Publication Data

US 2018/0061060 A1 Mar. 1, 2018

(51) Int. Cl.
*H04N 7/18* (2006.01)
*G06K 9/40* (2006.01)
*G06T 7/00* (2017.01)
*G06T 7/60* (2017.01)

(52) U.S. Cl.
CPC ............ *G06T 7/0085* (2013.01); *G06T 7/004* (2013.01); *G06T 7/60* (2013.01); *G06T 2207/20112* (2013.01)

(58) Field of Classification Search
CPC .......... G06T 7/004; G06T 7/0085; G06T 7/60
See application file for complete search history.

(56) References Cited

U.S. PATENT DOCUMENTS

| 8,559,748 | B2 * | 10/2013 | Banerjee | G06K 9/3283 |
| | | | | 382/266 |
| 9,055,183 | B1 * | 6/2015 | Capri | H04N 1/047 |
| 9,172,888 | B2 * | 10/2015 | Geiss | H04N 5/335 |
| 9,386,288 | B2 * | 7/2016 | Akeley | H04N 9/045 |
| 2012/0218215 | A1 * | 8/2012 | Kleinert | G06F 3/0418 |
| | | | | 345/173 |

* cited by examiner

*Primary Examiner* — Tsion B Owens
(74) *Attorney, Agent, or Firm* — Winston Hsu

(57) ABSTRACT

A method for determining leading edge location in an image captured by an optical navigation sensor with auto shutter adaptation includes: plotting average pixel values per sensor column on a graph; determining an average value according to the average pixel values as a threshold value; defining a weighted location in the leading half of the captured image according to the threshold value; and determining the leading edge location according to the defined weighted location.

4 Claims, 3 Drawing Sheets

EDGE DETECTION WITH SHUTTER ADAPTION

BACKGROUND OF THE INVENTION

1. Field of the Invention

The invention relates to edge detection in an optical navigation sensor, and more particularly, to edge detection in an optical navigation sensor which can maintain accuracy when the shutter frequency changes.

2. Description of the Prior Art

Edge detection is a technique used in optical navigation sensors, such as those found in optical mice, which utilizes pixel imaging and discontinuities in pixel intensity to determine when an area has been crossed. Standard edge detection relies on two fixed thresholds, which define a grey region within an image. Please refer to FIG. 1, which is a diagram illustrating edge detection according to the prior art. As shown in FIG. 1, a captured image will have different pixel values when an edge is crossed. Two thresholds, T1 and T2, are defined which respectively illustrate the point at which a white region becomes a grey region, and the point at which the grey region becomes a dark region. The edge will lie within the grey region and can be calculated using a weighted location.

Many optical navigation sensors have adaptive shutters, which change in frequency according to the level of contrast on an imaging surface. This adaptive shutter rate will affect the brightness of captured pixels, i.e. a longer shutter time will result in a brighter image. This will affect the position of the calculated weighted location.

The weighted location technique is illustrated in FIGS. 2A and 2B, which illustrate the distribution of average pixel values per sensor column for a same image taken with different shutter speeds. FIG. 2A illustrates the weighted edge location for an optical mouse having a sensor shutter speed of 66 dec. FIG. 2B illustrates the weighted edge location for an optical mouse having a sensor shutter speed of 162 pixels dec. Thresholds T1 and T2 are superimposed over these graphs, wherein T1 and T2 are the same respective values in both figures. As can be seen by comparing the two diagrams, the average pixel value for the lower shutter speed has far less variation than for the higher shutter speed. This can lead to quite different values when determining the edge location.

The sensor columns which fall within the range defined by T1 and T2 as well as those on either side are used to define the weighted location indicating where the edge is located. In FIG. 2A, the leading edge is therefore identified by the weighted location between sensor columns 5 and 8. In FIG. 2B, the leading edge is therefore identified by the weighted location between sensor columns 7 and 9. For FIG. 2A, this means the leading edge location is calculated at column 6.67, whereas for FIG. 2B, the leading edge location is calculated at column 8.16. This inaccuracy leads to difficulties when an optical mouse uses a sensor with auto shutter adaptation.

SUMMARY OF THE INVENTION

It is therefore an objective of the present invention to provide a technique for calculating leading edge location which improves the accuracy related to different auto shutter speeds.

This is achieved by providing a method for calculating leading edge location using a sensor distribution as opposed to a sensor range. Further, different threshold settings are used for different sensor shutter speeds.

A method for determining leading edge location in an image captured by an optical navigation sensor with auto shutter adaptation comprises: plotting average pixel values per sensor column on a graph; determining an average value according to the average pixel values as a threshold value; defining a weighted location in the leading half of the captured image according to the threshold value; and determining the leading edge location according to the defined weighted location.

The average value according to the average pixel values is determined as a threshold value by dividing the sum of the highest average pixel value and the lowest average pixel value by two, and utilizing the result as the threshold value.

The weighted location in the leading half of the captured image is defined according to the threshold value by determining which sensor column has a value closest to the threshold value in the leading half of the captured image, and defining the weighted location as a plurality of sensor columns which are symmetrical about the determined sensor column. A number of the plurality of sensor columns which are symmetrical about the determined sensor column is preferably 5.

These and other objectives of the present invention will no doubt become obvious to those of ordinary skill in the art after reading the following detailed description of the preferred embodiment that is illustrated in the various figures and drawings.

DETAILED DESCRIPTION

As detailed above, the present invention uses a sensor ADC distribution, rather than a sensor ADC range, as a means for determining edge location. This reduces inaccuracies between sensors of different shutter speeds, as the sensor distribution is not affected by shutter adaptation. Further, adaptive thresholds, corresponding to the particular shutter speed, will be applied.

Figure 1:
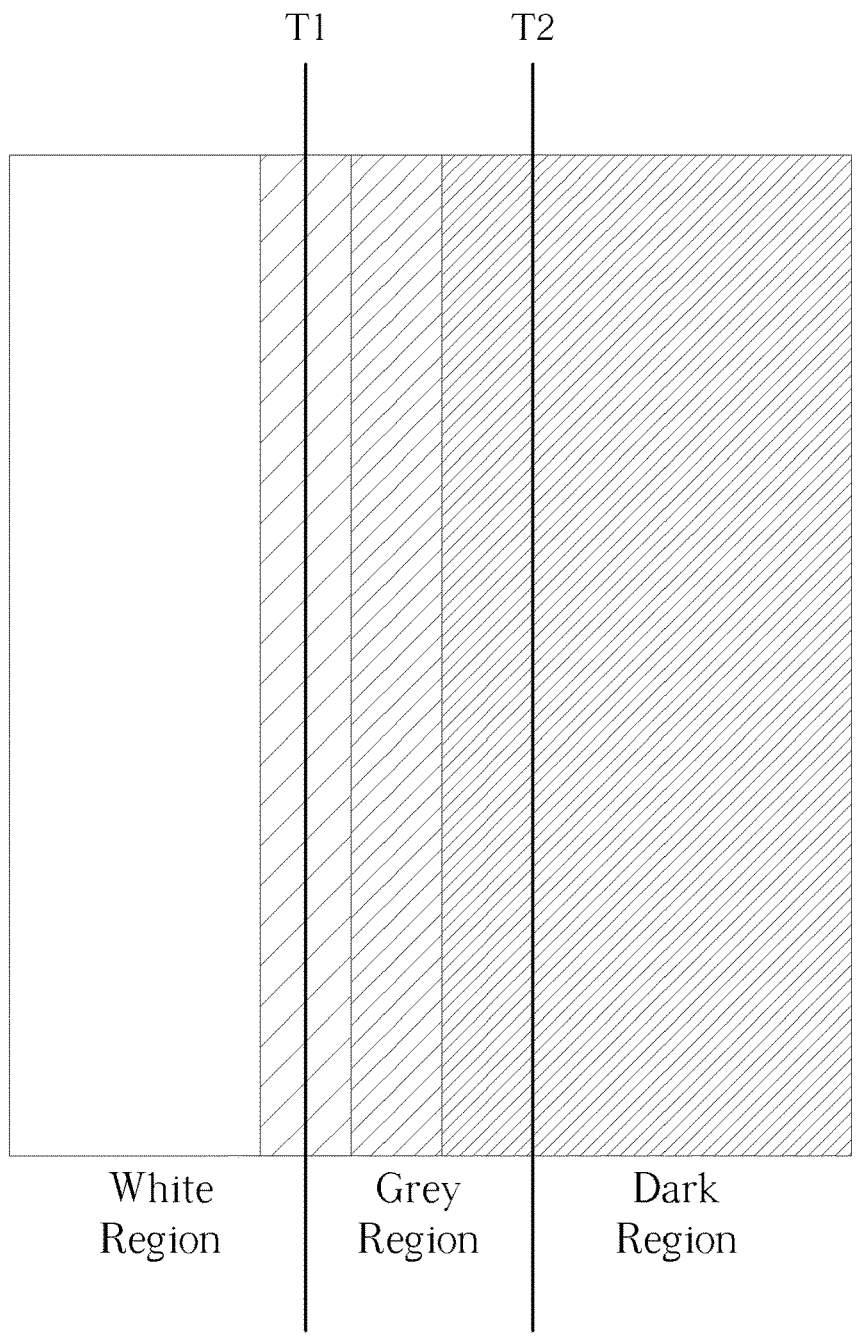
FIG. 1 illustrates the thresholds and different regions within an image captured by an optical sensor according to the related art.
Figure 2A:
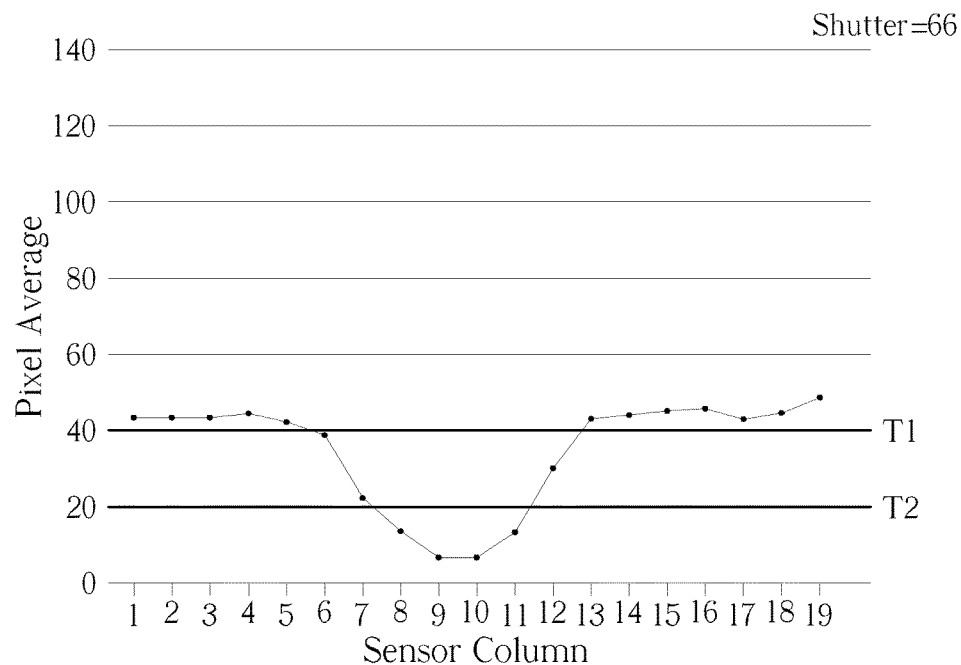
FIG. 2A illustrates determining an edge location according to a shutter speed of 66 dec according to the related art.
Figure 2B:
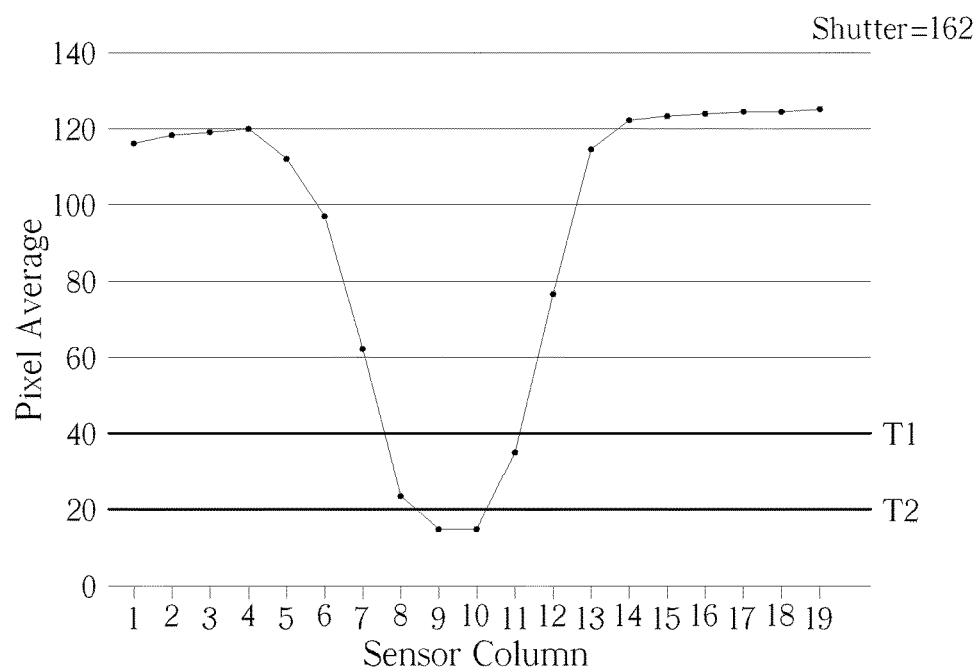
FIG. 2B illustrates determining an edge location according to a shutter speed of 162 dec according to the related art.
Figure 3:
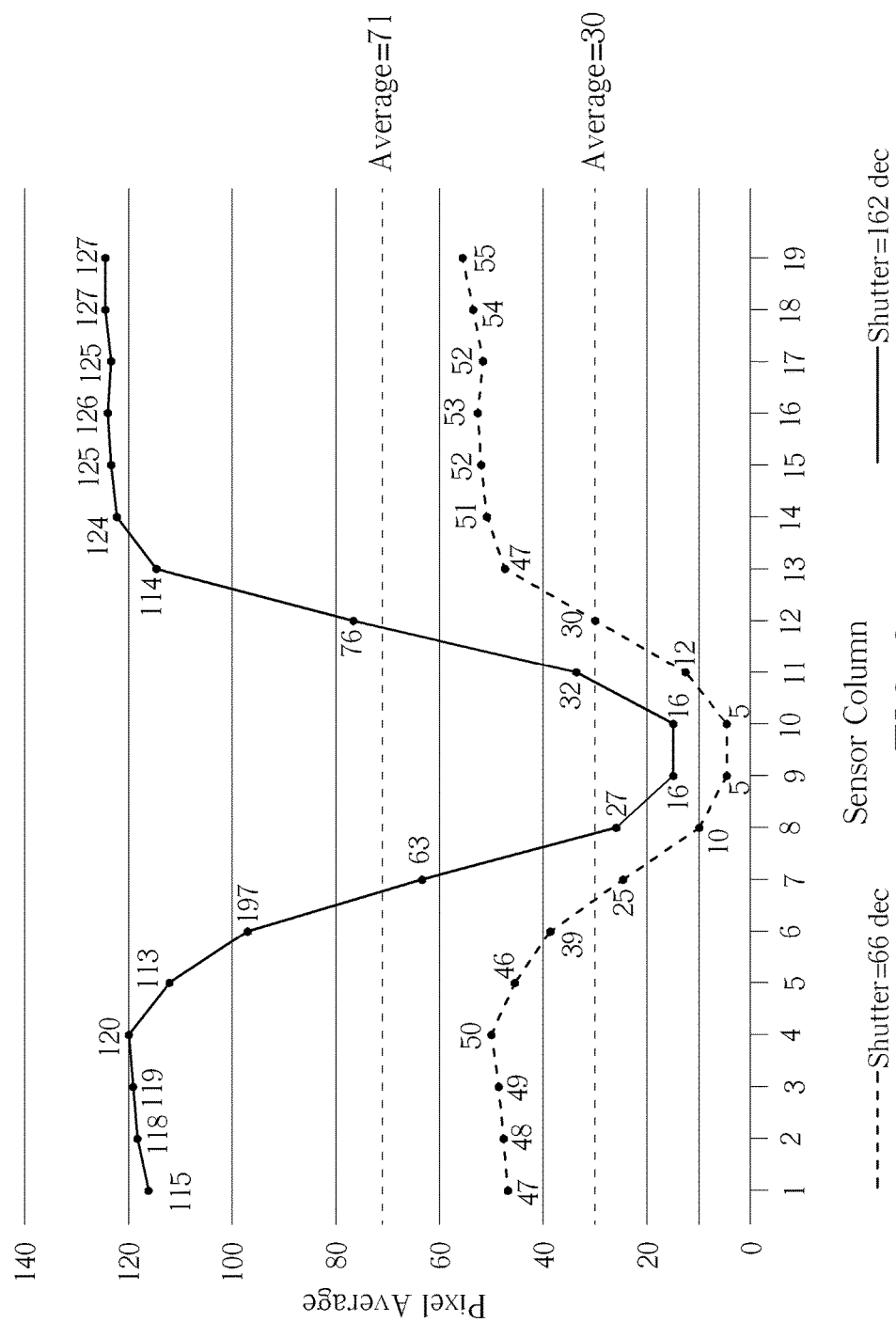
FIG. 3 illustrates pixel averages for sensor columns according to sensor shutter speeds 66 and 162 dec according to an exemplary embodiment of the present invention.

Please refer to FIG. 3, which illustrates pixel averages for sensor columns according to sensor shutter speeds 66 dec and 162 dec. The 66 dec shutter speed is illustrated by the dashed line, and the 162 dec shutter speed is illustrated by the solid line. Rather than defining two thresholds T1 and T2, wherein both shutter speeds use the same value T1 and T2 for determining an area defining a leading edge location, an average value between a maximum and minimum pixel value is defined for each shutter speed. The calculations for both shutter speeds are shown below.

For sensor shutter=66 dec
Maximum pixel value=55 (sensor column 19)
Minimum pixel value=5 (sensor columns 9 and 10)

Average between max and min values=(55+5)/2=30

For sensor shutter=162 dec
Maximum pixel value=127 (sensor columns 18 and 19)
Minimum pixel value=16 (sensor columns 9 and 10)

Average between max and min values=(127+16)/2=71

The threshold for 66 dec sensor shutter speed is therefore defined at 30, and the threshold for 162 dec sensor shutter speed is therefore defined at 71. The method then determines which sensor column is closest to each individual threshold. For both shutter speeds, it can be seen that column 7 is the closest sensor column, as pixel value 25 lies closest to the threshold line at 30, and pixel value 63 lies closest to the threshold line at 71. Please note that, although sensor column 12 for shutter speed 66 dec lies on the threshold, the invention is directed to defining a leading edge location.

The invention then uses the weighted location between sensor columns 5 and 9 to determine the leading edge. Sensor columns 5 to 9 are chosen as they are symmetrical about column 7. In a modification, it would be possible to use the weighted location between sensor columns 6 and 8, but this sacrifices some accuracy. Additionally, using a larger weighted location such as the weighted location between sensor columns 4 and 10 would result in extra calculation.

Using the above technique, the leading edge location for shutter speed 66 is calculated to lie at column 7.22 and the leading edge location for shutter speed 162 is calculated to lie at column 7.78. The variation in the detected edge location is only 0.56 pixels, compared with the prior art variation of 1.49 pixels.

The method of the present invention can therefore achieve greater accuracy, without requiring significantly more complicated algorithms. High edge location accuracy can therefore be guaranteed for an optical navigation sensor which uses auto shutter adaptation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing edge detection in an image captured by an optical navigation sensor with auto shutter adaptation, the optical navigation sensor having a plurality of sensor columns, comprising:
    plotting average pixel values per sensor column on a graph;
    determining an overall average pixel value of the captured image according to the average pixel values and using the overall average pixel value as a threshold value;
    using the threshold value to set a weighted location in a first half of the captured image defined by a first half of the plurality of sensor columns; and
    using the set weighted location to perform edge detection in the captured image.

2. The method of claim 1, wherein the step of determining an overall average value according to the average pixel values and using the overall average pixel value as a threshold value comprises:
    determining a highest average pixel value and a lowest average pixel value in the plurality of sensor columns, respectively; and
    dividing the sum of the highest average pixel value and the lowest average pixel value by two to give the overall average pixel value.

3. The method of claim 1, wherein the step of using the threshold value to set a weighted location in a first half of the captured image comprises:
    determining which sensor column in the first half of the plurality of sensor columns has an average pixel value closest to the threshold value; and
    setting the weighted location as a plurality of sensor columns comprising the determined sensor column, a number of sensor columns before the determined sensor column, and a number of sensor columns after the determined sensor columns, wherein the number of sensor columns before the determined sensor column is equal to the number of sensor columns after the determined sensor column.

4. The method of claim 3, wherein a number of the plurality of sensor columns which comprise the weighted location is 5.

* * * * *